United States Patent [19]

Lange et al.

[11] Patent Number: 4,737,641
[45] Date of Patent: Apr. 12, 1988

[54] APPARATUS FOR PRODUCING X-RAY IMAGES BY COMPUTER RADIOGRAPHY

[75] Inventors: Gottfried Lange; Michael Vieth, both of Erlangen, Fed. Rep. of Germany

[73] Assignee: Siemens Aktiengesellschaft, Berlin and Munich, Fed. Rep. of Germany

[21] Appl. No.: 890,111

[22] Filed: Jul. 28, 1986

[30] Foreign Application Priority Data

Aug. 16, 1985 [DE] Fed. Rep. of Germany ....... 3529306

[51] Int. Cl.⁴ .............................................. G01T 1/105
[52] U.S. Cl. ............................... 250/327.2; 250/484.1
[58] Field of Search .......................... 250/327.2, 484.1; 350/172, 173

[56] References Cited

U.S. PATENT DOCUMENTS

| 4,192,578 | 3/1980 | Suzuki et al. | 350/320 |
| 4,485,302 | 11/1984 | Tanaka et al. | 250/327.2 |
| 4,602,157 | 7/1986 | Kayser | 250/327.2 |
| 4,616,129 | 10/1986 | Yamada et al. | 250/207 |
| 4,631,407 | 12/1986 | Kawajiri et al. | 250/327.2 |

FOREIGN PATENT DOCUMENTS

| 0112469 | 7/1984 | European Pat. Off. | |
| 59-168943 | 9/1984 | Japan | |
| 59-215033 | 12/1984 | Japan | |
| 0262100 | 12/1985 | Japan | 250/361 R |
| 1251800 | 11/1986 | Japan | 250/484.1 |
| 1251799 | 11/1986 | Japan | 250/484.1 |

Primary Examiner—Janice A. Howell
Assistant Examiner—Constantine Hannaher
Attorney, Agent, or Firm—Hill, Van Santen, Steadman & Simpson

[57] ABSTRACT

An apparatus for producing x-ray images by computer radiography has a storage plate on which x-rays are incident after passing through an examination subject, and an image reader for detecting the photo-stimulatable luminescence of the storage plate. The storage plate has a carrier which is impenetrable by the radiation beams used for detecting the luminescence, the carrier having two major flat sides each having a photostimulatable storage layer thereon. Each side has a read-out system associated therewith for double sided read-out of the storage plate. By undertaking a double-sided read-out, increased absorption of the x-rays in the storage plate can be exploited, and thus a correspondingly increased efficiency in the read-out can be obtained.

19 Claims, 2 Drawing Sheets

APPARATUS FOR PRODUCING X-RAY IMAGES BY COMPUTER RADIOGRAPHY

BACKGROUND OF THE INVENTION

1. Field of the Invention

The present invention relates to devices for producing x-ray images by computer radiography, and in particularly to such devices having a storage plate and a reproduction means including an image reader for reading the photo-stimulated luminescence of the storage plate with at least one read-out beam on two sides of the plate.

2. Description of the Prior Art

In digital computer radiography, as is known, the image of the x-radiation after passing through an examination subject is retained in a storage plate and an image reader subsequently converts the image into digital electrical signals, so as to generate a visible image on a picture screen. In the storage plate, the x-rays are converted into electrical charge. For this purpose, the storage plate has a persistent storage luminophore which is cast in an organic binder and is applied to a transparent carrier, generally a foil. The image reader converts the planar pattern of various x-ray intensities into corresponding electrical signals, which are supplied to an image generating computer (image processor) via an analog-to-digital converter. After reconversion into analog signals, the image can be supplied to a display unit.

The storage plate is read by a high energy excitation beam, such as a red laser beam, and the photo-stimulated luminescence is successively supplied point-by-point to a common photomultiplier, and then to an amplifier via a light conductor. The laser beam is focused on the storage plate by suitable optics and is deflected or swept across the line by the action of a rotating mirror. The storage plate is shifted in steps relative to the fan of the laser beam, so that the entire image is read line-by-line by the laser beam. For double sided read-out, respective light conductors can be disposed at both flat sides of the storage plate, as described in U.S. Pat. No. 4,485,302.

In an apparatus for producing x-ray images, it is also known to use a substrate having storage (persistent) material on both flat sides. The substrate consists of a material which absorbs the low-energy component of the radiation. In such an arrangement, the various storage layers must be successively read-out, as described in European published application 0 112 469.

A good efficiency for the storage arrangement is obtained if a significant part of the x-ray quanta are absorbed by the persistent storage luminophore. For that purpose, the layer thickness of the storage luminophore should be in theory selected as large as possible. With increasing layer thickness, however, a loss in resolution occurs and the image become less sharp. The loss of resolution is caused by oblique irradiation by the x-rays at the edge of the storage plate. When the x-rays are incident on the storage plate at an angle relative to the normal, an excitation of the luminophore of the storage luminescence screen caused by that x-ray also occurs at an angle relative to the normal. Given an approximately punctiform x-ray, this results in an elliptical deformation. The distortion becomes greater at the edge of the storage plate as the thickness of the storage luminescence screen increases.

In the read-out of the storage plate with a very fine read beam, a decrease in the sharpness of the image also occurs due to smearing of the read-out regions caused by scatter of the read beam and of the excited light in the storage luminophore, which generally consists of polycrystalline material. Such scatter causes an effective diameter which deviates considerably from the actual diameter of the read beam. The deviation is approximately on the same order of magnitude as the layer thickness of the storage luminophore.

The layer thickness, therefore, cannot be selected arbitrarily large. The efficiency of the storage arrangement is thus correspondingly limited, so that the radiation dose must be increased in order to achieve adequate brightness in the read-out. Such a solution, however, results in an undesireable increase in the radiation load on the examination subject.

For investigating the influence of the radiographic image quality on the diagnostic precision, it is known to employ a double film cassette which contains a standard system and a low-dose system. Each system includes films and luminescent layers having respectively different properties. One film is disposed between two luminescent layers in each system. The two systems are separated by a lead foil. Two images with different radiation energy are thus obtained of the examination subject. These images are further processed for subtracting soft organs or bones so that these features can be made more visible. The noise is considerably higher and the low-dose system, and the image quality is considerably diminished. Such a system is described in Med. Phys. 11, Vol. 5, Sept/Oct., 1984, pages 646-652.

SUMMARY OF THE INVENTION

It is an object of the present invention to provide an x-ray diagnostics installation using a storage plate and a readout system for the storage plate which has a high read-out efficiency and minimal deterioration in the image resolution.

The above objects are achieved in accordance with the principles of the present invention by the use of a storage plate having a carrier consisting of material which is impenetrable by the beam used for read-out of the storage plate, the carrier having a photo-stimulatable storage layer on each of its major flat sides. A double read-out means using at least one read-out beam is provided for double-sided read-out of the storage plate, with separate excitation and separate read-out of each of the storage layers being undertaken.

A higher efficiency than in conventional devices is obtained using the storage plate and double read-out means described herein without diminishing the resolution. Using the double scanner with separate excitation and separate read-out of the storage layers, the two read beams (which may originate from a single source) are guided such that their respective focal points on the associated storage plate are always disposed directly opposite each other, and thus no lack of sharpness results due to shifting of the structures of the images on the two flat sides. A correspondingly increased x-ray absorption is obtained because the layer thickness can be increased. In a preferred embodiment, a common radiation source for the read beam is provided for double-sided read-out, the read beam being divided into two components which are respectively provided for each of the photo-simulatable storage layers.

DESCRIPTION OF THE PREFERRED EMBODIMENTS

Figure 1:
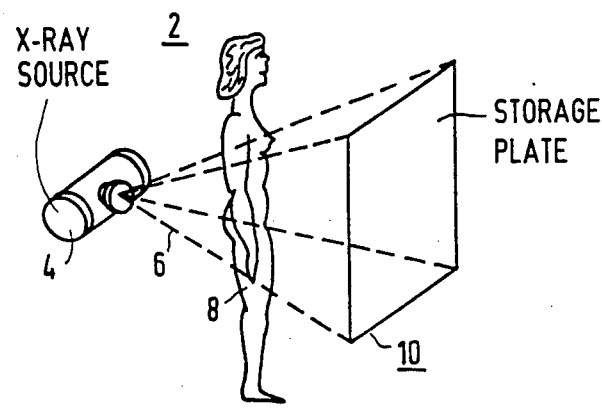
FIG. 1 is a perspective view of a radiographic installation showing the basis components thereof.

A general arrangement of the basic elements of an x-ray diagnostic installation is shown in FIG. 1. These basic elements are present in prior art devices as well as in an apparatus constructed in accordance with the principles of the present invention, as described in greater detail below. The installation 2 includes an x-ray source 4 for generating an x-ray beam 6 which penetrates an examination subject 8. The x-rays 6 are incident on a storage plate 10. The storage plate 10 retains the radiated image of the examination subject 8, which is subsequently made visible on a picture screen by a reproduction means, or may alternatively be depicted in printed form by a printer.

Figure 2:
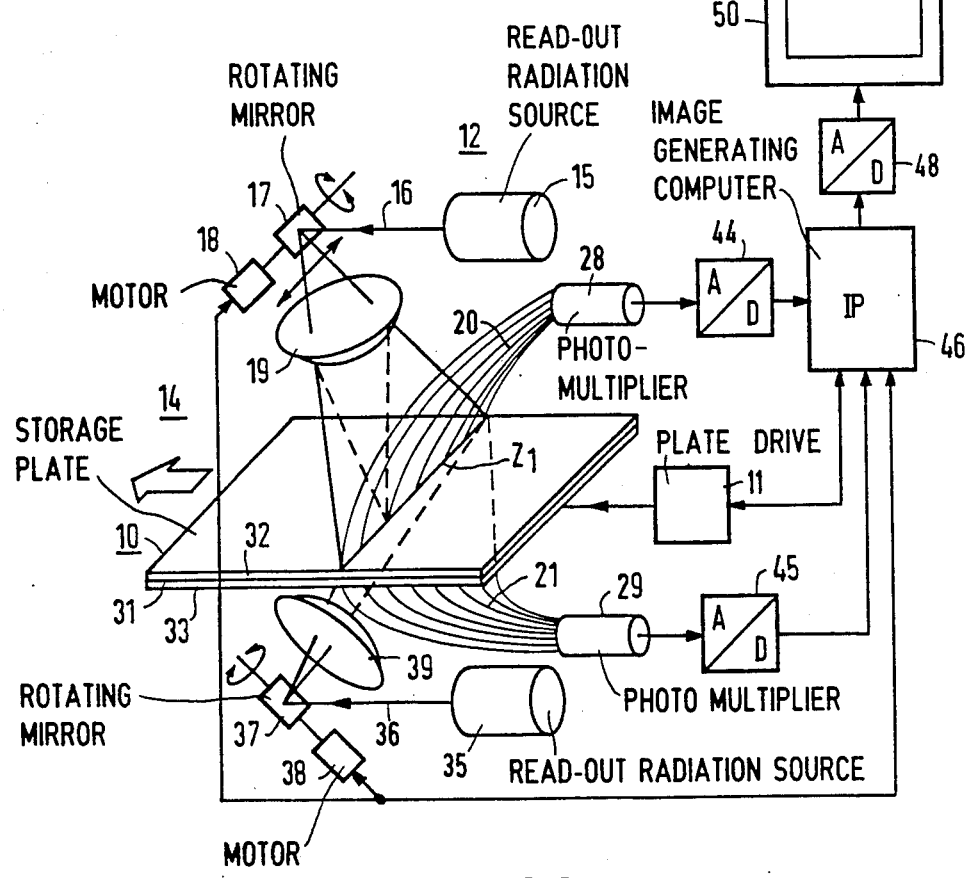
FIG. 2 is a schematic block diagram of the double-sided read-out device constructed in accordance with the principles of the present invention.

One embodiment for producing an x-ray image in accordance with the principles of the present invention is shown in FIG. 2. The embodiment of FIG. 2 includes a reproduction means 12 which includes a device 14 for double-sided read-out of the storage plate 10. The storage plate 10 comprises a carrier 31 which is opaque for the photo-stimulating read beam of the read-out device 14. The read beam is preferably a laser beam. The carrier 31 has respective photo-stimulatable storage layers 32 and 33 on each of its two major flat sides. A separate excitation beam and a separate read-out are provided for each of the storage layers 32 and 33. The thickness of the storage layers 32 and 33 may, for example, be in the range of about 100 through about 300 $\mu$m. For special diagnostic needs, the layers may be selected of differing thicknesses in order to obtain dose distributions, for example, having different contrast or topical resolution.

As stated above, read-out of an image pattern caused by the x-radiation 6 is undertaken separately for each of the storage layers 32 and 33. For this purpose, the read-out device 14 may have separate radiation sources for the read-out radiation, preferably lasers, for each of the storage layers. Such separate sources are references 15 and 35 in FIG. 2. The generated radiation beams (laser beams) 16 and 36 are of identical length and have coincident focal points in order to obtain synchronized focusing on both flat sides of the carrier 31. The beams 16 and 36 are incident on respective deflection devices such as rotating mirrors 17 and 37, respectively driven by motors 18 and 38. The beams 16 and 36 are each focused onto a point of an image line of the storage plate 10 by optics such as respective focusing lens 19 and 39, and can be swept over the length of the image lines point-by-point by the rotating mirrors 17 and 37. For clarity, only the image line at the upper flat side is shown in the Figure, and references $Z_1$. Allocation of the individual electrical signals from the image points of the image lines is obtained by coupling an image generating computer (image processor) 46 to both of the motors 18 and 38 for the rotating mirrors, as well as to a drive unit 11 for moving the storage plate 10 as indicated by the arrow.

If the radiation beams 16 and 36 are, for example red laser beams, they will trigger a blue luminescent emission in the image points of the image lines. This emission is supplied to respective photomultipliers 28 and 29 via respective light conductors 20 and 21, and is converted into electrical signals. The electrical signals are supplied to the computer 46 through respective analog-to-digital converters 44 and 45. The image is compiled in the computer 46, and after re-conversion of the signals in a digital-to-analog coverter 48, the image can be made visible on a display unit 50.

In a further embodiment of the storage plate 10, the carrier 31 carrying the luminescent material may consist of a material, preferably metal such as lead, aluminum or copper, which influences the quality of the x-radiation, so that the dose distributions retained in the storage layers 32 and 33 can be identified, for example, on the basis of different beam hardness or on the basis of differing spectra.

The signals read at both flat sides of the storage plate 10 can either be used individually for generating a digital x-ray image, or can be utilized in common for image processing, for example, for substraction of images for contrast enhancement of selected features.

Figure 3:
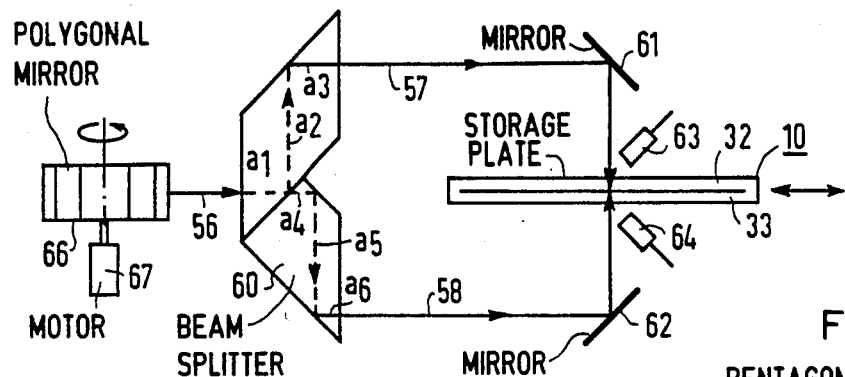
FIGS. 3, 4 and 5 schematically show further embodiments of the read-out device shown in FIG. 2.

An embodiment of the read-out system employing a single read-out radiation source is shown in FIG. 3. In this embodiment, a single read-out beam 56 is divided into two beam components 57 and 58 by a beam splitter 60. The beam splitter 60 may, for example, be a double prism. The beam paths of the two components within the double prism are identical, i.e., $a_1+a_2+a_3=a_4+a_5+a_6$. Such a beam splitter is described by Durst et al in the "2nd Int. Conf. opt. Fib. Sens.", Stuttgart 1984. Respective reflectors, such as mirrors 61 and 62, are provided for each of the two beam components 57 and 58. The beam components 57 and 58 are respectively perpendicularly incident on the storage layers 32 and 33 of the storage plate 10. Detectors 63 and 64 pick-up the photo-stimulated luminescence. The detectors 63 and 64 may, for example, be a row-shaped arrangement of optical fibers in accordance with FIG. 2 which are connected to photomultipliers. The storage plate 10 is provided with a drive, schematically indicated in the Figure by the double arrow. A polygonal mirror 66 may be provided for supplying the laser beam 56 to the beam splitter 60, the polygonal mirror 66 being provided with a drive motor 67. This embodiment using a common radiation source for one read-out beam which is then divided into components has the advantage that synchronization of the reproduction means is simplified.

Figure 4:
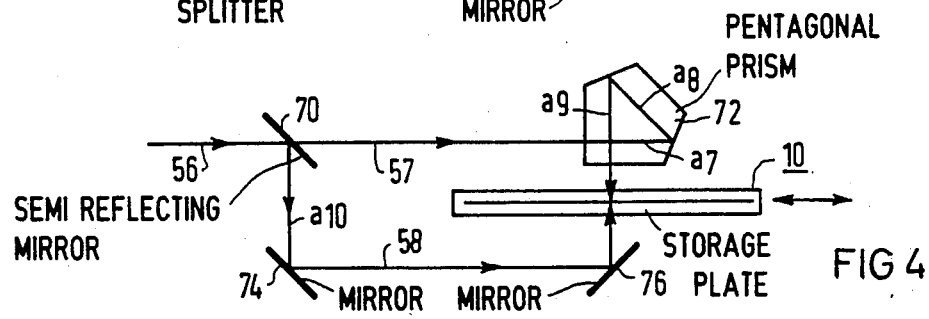

In the embodiment shown in FIG. 4, a semi-reflecting mirror 70 is provided for read beam 56, the mirror 70 dividing the beam 56 into the two beam components 57 and 58. A pentagonal prism 72 is provided for the beam component 57, whereas the beam component 58 is deflected by two mirrors 74 and 76 and is directed to the storage plate 10. The pentagonal prism 72 is dimensioned such that its beam paths $a_7$ through $a_9$ are equal to the beam path $a_{10}$ of the beam component 58.

Figure 5:
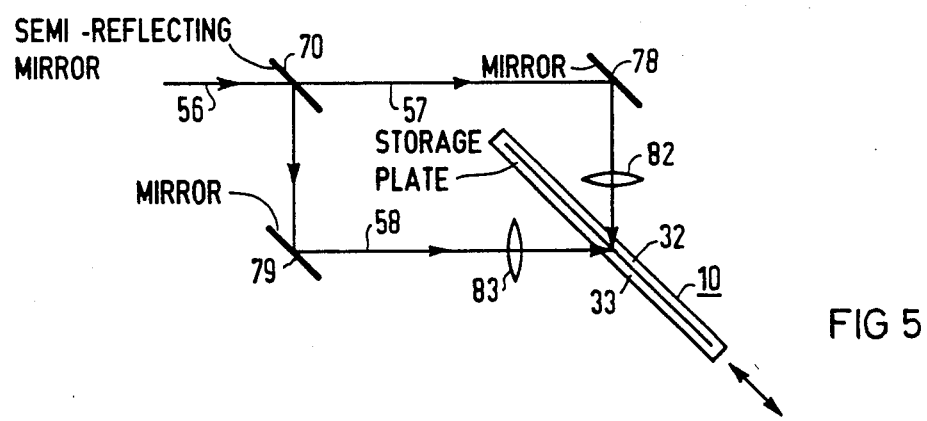

In the embodiment shown in FIG. 5, the read-out beam 56 is split into the two components 57 and 58 by the semi-reflecting mirror 70, and these components are respectively directed to the storage plate 10 by mirrors 78 and 79 such that the components 57 and 58 have identical beam paths. The beam components 57 and 58 are respectively incident on the storage layers 32 and 33 at an angle of 45°. As a result of the oblique irradiation by the two beam components 57 and 58, an elliptical distortion occurs at the respective points of incidence of the beam components. This distortion may be compensated, for example, by respective cylindrical lens 82 and 83.

Figure 6:
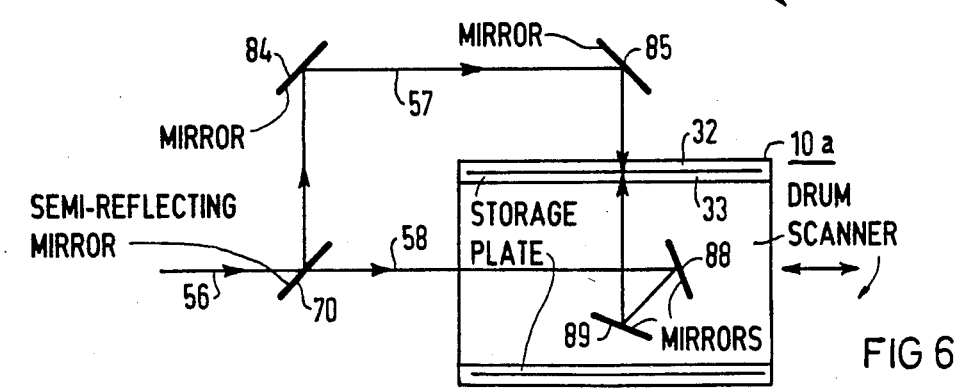
FIG. 6 shows an embodiment of the read-out device for use with a drum scanner.

The embodiment shown in FIG. 6 is adapted for use with a drum scanner of the type disclosed, for example, in SPIE Proc., Vol. 390, pp. 70–78. The storage plate 10 in this embodiment is in the form of a hollow cylinder, with the storage layer 32 forming the exterior of the cylinder, and the storage layer 33 forming the interior of the cylinder. The beam component 57 is directed to the outside storage layer 32 by the semi-reflecting mirror 70 and two additional mirrors 84 and 85. The beam component 58 is used for read-out of the inside storage layer 33. Instead of using a single mirror to direct the beam 58 onto the layer 33, it is necessary to compensate for the longer path of the beam 57, therefore the path of the beam 58 is lengthened by reflecting the beam 58 using mirrors 88 and 89. The beam paths for the beam 57 and 58 are thereby made equal. In the embodiment of FIG. 6, the beam components 57 and 58 are not moved, rather the storage plate 10 is rotated around the center axis of the hollow cylinder. The plate 10 is rotated by a motor (not shown) at a high speed as schematically indicated by the curved arrow, and a separate motor executes a slow linear movement of the storage plate 10 in the direction of its central axis, as schematically indicated by the straight double arrow, so that the storage plate 10 is swept line-by-line. In contrast to the line-by-line detection of the emitted light in the embodiments employing a flat storage plate 10, in the embodiment of FIG. 6 only a single detector aligned to a point is needed.

Although modifications and changes may be suggested by those skilled in the art it is the intention of the inventors to embody within the patent warranted hereon all changes and modifications as reasonably and properly come within the scope of their contribution to the art.

I claim as my invention:

1. An apparatus for producing x-ray images of an examination subject disposed in an x-ray beam comprising:
   a storage plate disposed for receiving x-radiation after passage through said examination subject, said storage plate having a carrier with two major faces and a photo-stimulatable storage layer disposed on each of said faces; and
   a double read-out means for read-out of each of said storage layers, said double read-out means including means for simultaneously separately exciting each of said storage layers with a read-out radiation beam, said carrier being opaque to said read-out radiation beam, and means for simultaneously separately reading out each of said storage layers upon excitation thereof.

2. An apparatus as claimed in claim 1, further comprising means for sweeping each of said read-out beams along a line of said respective storage layers.

3. An apparatus as claimed in claim 2, further comprising means for moving said storage plate substantially perpendicularly to said line.

4. An apparatus as claimed in claim 1, wherein said storage layers have respectively different layer thicknesses.

5. An apparatus as claimed in claim 1, wherein said storage layers consist of respectively different storage materials.

6. An apparatus as claimed in claim 1, wherein said carrier consists of a metal foil.

7. An apparatus as claimed in claim 6, wherein said carrier consists of a metal selected from the group consisting of copper, iron, lead and alumimum.

8. An apparatus as claimed in claim 1, wherein said means for simultaneously separately exciting each of said storage layers consists of a single read-out radiation beam source, means for splitting said radiation beam into two beam components, and means for respectively directing said beam components onto said storage layers.

9. An apparatus as claimed in claim 8, wherein said means for splitting said read-out radiation beam is a double prism with the respective paths of the two beam components in said double prism beam identical.

10. An apparatus as claimed in claim 8, wherein said means for splitting said read-out radiation beam is a semi-reflecting mirror.

11. An apparatus as claimed in claim 10, wherein said storage plate is disposed with respect to said semi-reflecting mirror with a pentagonal prism disposed in the path of one of said beam components between said semi-reflecting mirror and said storage plate such that the beam paths for each beam component between said semi-reflecting mirror and said storage plate are identical.

12. An apparatus as claimed in claim 1, wherein said storage plate is flat.

13. An apparatus as claimed in claim 1, wherein said storage plate is a hollow cylinder with one of said storage layers forming an exterior of said cylinder and the other of said storage layers forming an interior of said cylinder.

14. An apparatus as claimed in claim 1, wherein said storage plate is disposed at an angle other than 90° with respect to said read-out beam.

15. An apparatus as claimed in claim 14, wherein said angle is 45°.

16. An apparatus as claimed in claim 14, further comprising means for compensating for elliptical beam distortion caused by the angular disposition of said storage plate.

17. An apparatus as claimed in claim 1, wherein said read-out beam is a laser beam.

18. An apparatus as claimed in claim 1, wherein said read-out beam is a red laser beam.

19. An apparatus for producing x-ray images of an examination subject disposed in an x-ray beam comprising:
   a storage plate disposed for receiving x-radiation after passing through said examination subject, said storage plate having a carrier with two major faces and a photo-stimulatable storage layer disposed on each of said faces;
   a double read-out means including two read-out systems for respectively reading out each of said storage layer, each read-out system including a radiation source for generating a read-out radiation beam, means for sweeping said beam along a line of one of said storage layers, a photomultiplier having a plurality of inputs for receiving stimulated light from one of said storage layers generated by the read-out beam incident thereon and for converting said stimulated light into an electrical signal;

means for moving said storage plate during read-out thereof for permitting said read-out beams of said read-out systems to cover substantially all of said major faces; and means having inputs connected to the outputs of said read-out systems for generating a visible image of said examination subject from said electrical signals.

* * * * *